H. KORRODI.
SIGHT DEVICE WITH TELESCOPE.
APPLICATION FILED MAY 24, 1910.
988,643.
Patented Apr. 4, 1911.
2 SHEETS—SHEET 1.
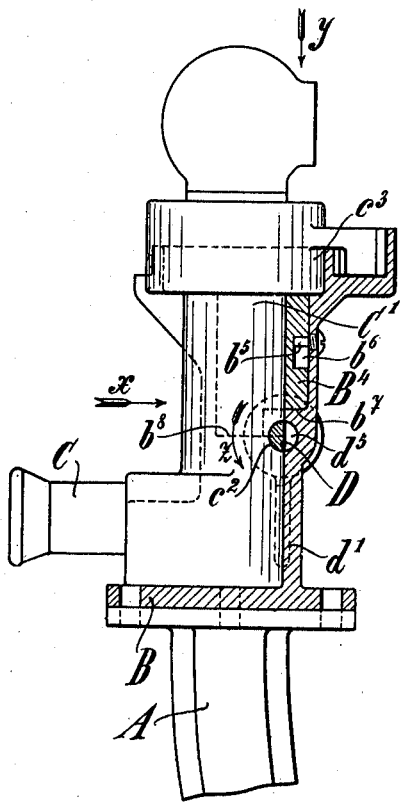
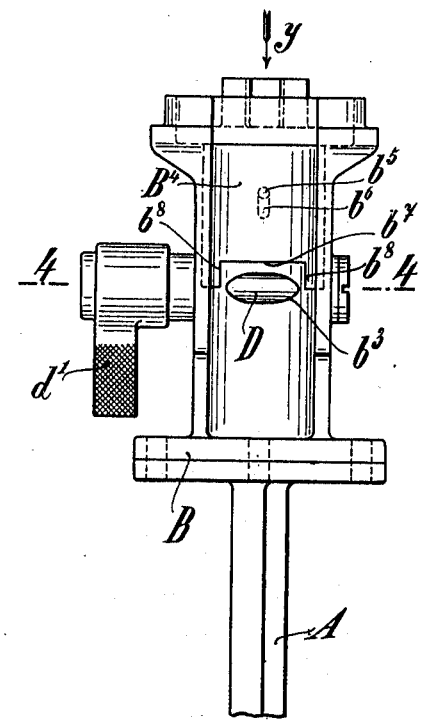
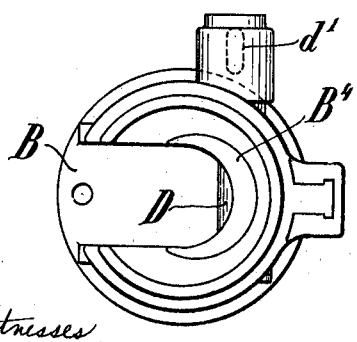
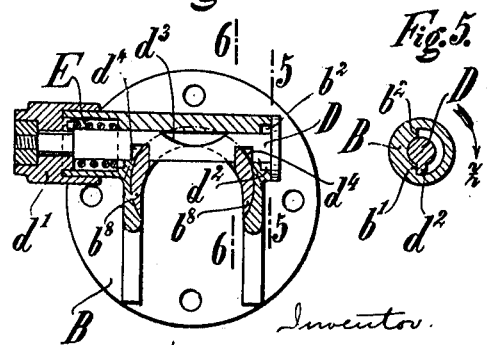

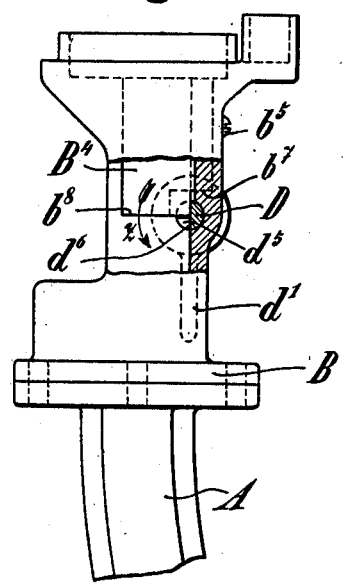
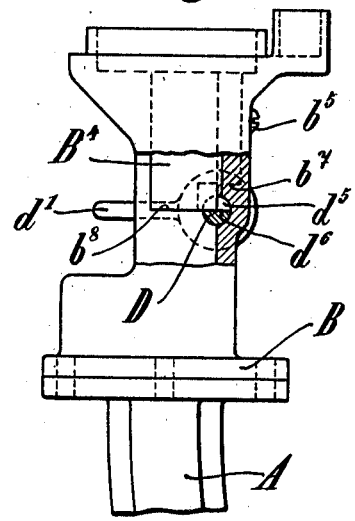
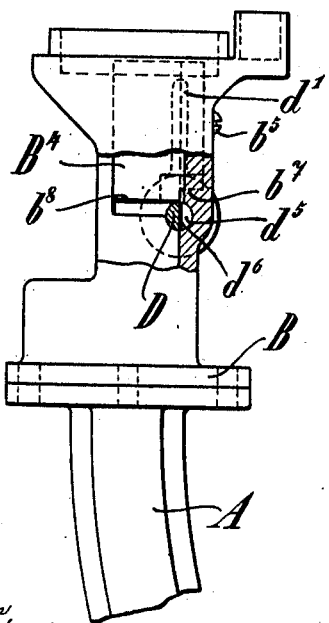
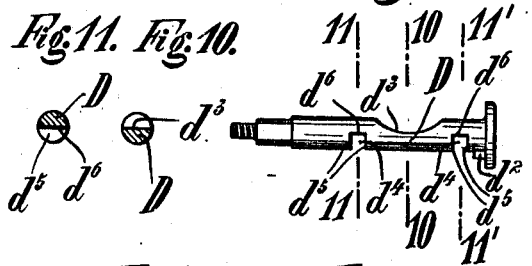
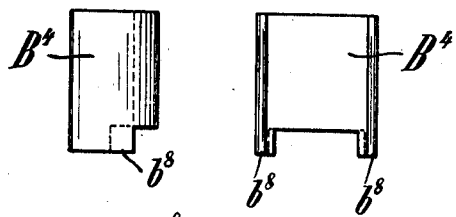

UNITED STATES PATENT OFFICE.

HEINRICH KORRODI, OF BERNE-KIRCHENFELD, SWITZERLAND, ASSIGNOR TO FRIED. KRUPP AKTIENGESELLSCHAFT, OF ESSEN-ON-THE-RUHR, GERMANY.

SIGHT DEVICE WITH TELESCOPE.

988,643. Specification of Letters Patent. Patented Apr. 4, 1911.

Application filed May 24, 1910. Serial No. 563,168.

*To all whom it may concern:*

Be it known that I, HEINRICH KORRODI, a citizen of Switzerland, and a resident of 8 Kramburgerstrasse, Berne - Kirchenfeld, Switzerland, have invented certain new and useful Improvements in Sight Devices with Telescopes, of which the following is a specification.

This invention relates to a sighting device having a telescope, which can be connected with its carrier by forcing it into a guide arranged thereon. Since in such a connection of the telescope with the telescope carrier, the telescope must obviously be rigidly gripped and held in place by the sides of the guide, it follows that, in removing the telescope from the guide in the known arrangements of this kind, the release of the telescope is effected only by the use of force. This readily results in injury to the guiding surfaces or to the telescope.

The purpose of this invention is to avoid this objection, and is attained, according to the invention, by providing the telescope with a manually adjustable part which is so combined that by a suitable adjustment of this part, the telescope can be forced a certain distance out of its guide.

One embodiment of the invention is shown in the accompanying drawings applied to a sight-attachment with panoramic sight-telescope.

Figure 1 is a side view, partly in section, of the attachment head with the telescope; Fig. 2 is a view, looking in the direction of the arrow $x$, Fig. 1, of the attachment head without the telescope; Fig. 3 is a top view of Fig. 1, showing the attachment head without the telescope; Fig. 4 is a section on line 4—4, Fig. 2, looking from above; Fig. 5 is a section on line 5—5, Fig. 4, looking from the left; Figs. 6, 7 and 8 are side views corresponding to Fig. 1, showing the attachment head without the telescope, these views being partly in section on line 6—6, Fig. 4, looking from the right, and showing the parts in different positions; Fig. 9 is a detail in a view corresponding to that shown in Fig. 4; Fig. 10 is a section on line 10—10, Fig. 9, looking from the right; Fig. 11 is a section on line 11—11 or 11'—11', Fig. 9, looking from the right; Fig. 12 is another detail in a view corresponding to that shown in Fig. 2; Fig. 13 is a side view of Fig. 12; and Fig. 14 is a top view of Fig. 13.

A indicates the attachment bar, B the telescope carrier which is firmly connected with the attachment bar, and C the panoramic sight telescope which can be inserted in a guide on the telescope carrier in the direction of the arrow $y$ (Figs. 1 and 2). The part $C^1$ of the telescope housing which is adapted to enter the guide is substantially of cylindrical shape. In the telescope carrier B a bolt D having a handle $d^1$ is rotatably mounted in the known manner, the axis of rotation of the bolt intersecting the direction of movement of the telescope at a right angle. The bolt D has one end provided with a stop $d^2$ (Figs. 4, 5 and 9) for which two corresponding shoulders $b^1$ and $b^2$ (see especially Fig. 5) are provided on the bearing of the bolt. These shoulders are arranged in such a manner that the bolt can turn only at an angle of 180°. The bolt is under the action of a spring E (Fig. 4) which tends to turn the bolt in the direction of the arrow $z$ (Figs. 1, 5 and 6) and, when the bolt is in the locking position shown in Fig. 1, the spring E causes the bolt to lie with its stop $d^2$ against the shoulder $b^1$ on the bearing. In this position of the bolt a part of the shank of the bolt projects through an opening $b^3$ (Fig. 2) in the telescope carrier B into the path of movement of the part $C^1$ of the telescope and, when the telescope is in the position of use shown in Fig. 1, the projecting part of the shank of the bolt engages in a notch $c^2$ (Fig. 1) in the part $C^1$ so that the telescope is locked in position. That part of the bolt D which, when the parts are in this position, is away from the telescope is provided with a recess $d^3$ (see especially Figs. 4 and 9) which is shaped and arranged in such a manner that it fits the curvature of the cylindrical part $C^1$ of the telescope when the bolt is turned 180° from its locking position against the action of the spring E, that is, in the opposite direction of the arrow $z$. When the bolt D is in this position, in which the stop $d^2$ lies against the shoulder $b^2$ (Figs. 4 and 5), the telescope can therefore be freely removed from the guide.

The arrangement so far described is old and no claim is made thereto.

A part of the guide for the telescope is formed by a bush $B^4$ which is mounted in the telescope carrier B in the manner shown in the drawings and which is slidable in the same direction as the telescope. At that side toward which the telescope is moved when being removed from the guide, the bush abuts against a collar $c^3$ (Fig. 3) on the telescope. A pin $b^5$, which is secured in the telescope carrier and which engages in a groove $b^6$ in the bush, prevents the bush from turning and from sliding too far in the direction of removal of the telescope. A shoulder $b^7$ on the telescope carrier prevents the bush from sliding too far in the opposite direction. The bush is provided with two ears $b^8$ the end surfaces of which are located on level with the axis of the bolt D and engage in two recesses $d^4$ in the bolt D when the bush abuts the shoulder $b^7$. Each of these recesses has two straight side walls $d^5$ (Fig. 9) which are at right angles to the axis of the bolt and each recess has a straight bottom surface $d^6$ which is at right angles to the side walls $d^5$ and passes through the axis of the bolt. When the bolt is in its locking position, the bottom surfaces $d^6$ extend parallel to the direction of displacement of the bush $B^4$, that is they are located outside of the path of movement of the ears $b^8$ (see Fig. 6). If the telescope is to be removed from its guide the bolt D is turned against the action of the spring E, that is, in the opposite direction of the arrow $z$ (Fig. 6). When the bolt D has been turned 90°, the bottom surfaces $d^6$ of the recesses $d^4$ of the bolt D become located under the ears $b^8$ of the bush $B^4$, as shown in Fig. 7. When the bolt is turned farther in the same direction, the bush is pushed upwardly (see Fig. 8) and carries the telescope along with it, as the bush abuts the collar $c^3$ on the telescope. There is nothing to prevent this being done because the bolt, when it has turned 90° in the direction just mentioned, releases the telescope to such an extent that it can partake of the sliding movement of the bush (see Fig. 1). The sliding movement of the bush continues until the bolt has turned 180° altogether (Fig. 8) and has entirely released the telescope as the recess $d^3$ is then turned toward the part $C^1$ of the telescope. After the telescope has thus been released by the unlocking movement of the bolt D it can easily be entirely removed from its guide by hand. As soon as the telescope has entirely passed out of its guide, the spring E causes the bolt D to automatically return to the locking position upon the release of the handle $d^1$. The bush $B^4$ can then be forced by hand back into its extreme position shown in Figs. 1, 2 and 6. The insertion of the telescope in its guide and the locking of the telescope take place in a similar manner and need not be further explained.

I claim:—

1. In a sighting device having a telescope carrier and a telescope sliding into engagement with the carrier, a manually adjustable part, having displacing connection with the telescope and acting thereon in the direction of its disengagement from the carrier.

2. In a sighting device having a telescope and a guide into which said telescope slides, a bush forming a portion of said guide, having displacing engagement with the telescope and slidable in the guide in the direction of removal of the telescope and a manually operated part having displacing connection with the bush and, through it, with the telescope.

3. In a sighting device having a telescope and a guide into which said telescope slides, a bush forming a portion of said guide, having displacing engagement with the telescope and slidable in the guide in the direction of removal of the telescope, and a transversely disposed shaft constructed with eccentric portions having displacing connection with the bush and, through it, with the telescope.

4. In a sighting device having a telescope carrier and a telescope sliding into engagement therewith, a locking bolt movable into and out of locking relation to the telescope having displacing connection therewith, and by its unlocking movement moving the telescope in the direction of disengagement from the carrier.

5. In a sighting device comprising a telescope a carrier guide into which the telescope slides, and a transversely pivoted bolt having eccentric portions adapted respectively to lock and to displace the telescope relatively to the guide and reciprocally movable into locking and displacing positions.

6. In a sighting device having a telescope carrier and a telescope engaging with its carrier by a sliding movement, a bushing forming a part of the guide for the telescope on the carrier, and movable on the carrier in the direction of releasing the telescope from the carrier, and a locking bolt mounted on the carrier and engaging the bushing by its unlocking movement in the direction to impart releasing movement to the bushing.

7. In a sighting device having a telescope carrier constructed with a guide and a telescope sliding into said guide; a bushing mounted within the carrier and adapted to abut against the telescope, a locking bolt journaled within the carrier, moving in one direction into locking engagement with the telescope and having a part which impinges the bushing by its movement in the direction opposite to locking movement, and by such impingement moving the bushing and with it the telescope in the direction of disengagement from the carrier.

8. In a sighting device, a telescope carrier and a telescope slidable into engagement therewith, a bushing slidably mounted on said carrier, adapted to abut against the telescope in the direction of releasing the telescope from the carrier and having downwardly projecting ears, and a locking bolt mounted on the carrier having recesses receiving the downwardly projecting ears on the bushing when the telescope is in position, and having surfaces in said recesses in position to impinge said ears and move the bushing in the direction of releasing the telescope when the locking bolt is rotated to unlocking position.

The foregoing specification signed at Berne, Switzerland, this 9 day of May, 1910.

HEINRICH KORRODI.

In presence of—
 REBOLD,
 CHARLES GERSTER.

Copies of this patent may be obtained for five cents each, by addressing the "Commissioner of Patents, Washington, D. C."